US009594844B2

(12) United States Patent
Zeigler et al.

(10) Patent No.: US 9,594,844 B2
(45) Date of Patent: Mar. 14, 2017

(54) SELECTIVELY DELETING ITEMS THAT ARE NOT OF INTEREST TO A USER

(75) Inventors: Andrew Zeigler, Seattle, WA (US); Jennifer C. Trahan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1479 days.

(21) Appl. No.: 11/936,940

(22) Filed: Nov. 8, 2007

(65) Prior Publication Data

US 2009/0125827 A1 May 14, 2009

(51) Int. Cl.
*G06F 3/048* (2013.01)
*G06F 17/30* (2006.01)

(52) U.S. Cl.
CPC ............... *G06F 17/30899* (2013.01)

(58) Field of Classification Search
USPC ................... 715/738, 765; 707/768
See application file for complete search history.

(56) References Cited

U.S. PATENT DOCUMENTS

| 6,453,342 | B1 | 9/2002 | Himmel et al. |
| 6,638,314 | B1* | 10/2003 | Meyerzon et al. ........... 715/234 |
| 6,725,269 | B1* | 4/2004 | Megiddo ........... 709/228 |
| 7,136,885 | B2* | 11/2006 | Wright et al. |
| 7,194,688 | B2* | 3/2007 | Sezan et al. ........... 715/719 |
| 7,457,822 | B1* | 11/2008 | Barrall et al. |
| 7,680,875 | B1* | 3/2010 | Shopiro et al. ........... 709/200 |
| 2002/0029246 | A1 | 3/2002 | Kumagai |
| 2002/0162009 | A1* | 10/2002 | Shmueli et al. ........... 713/200 |
| 2002/0191015 | A1* | 12/2002 | Brown et al. ........... 345/738 |
| 2002/0191020 | A1* | 12/2002 | Kaply et al. ........... 345/764 |
| 2002/0194222 | A1 | 12/2002 | Kaply et al. |
| 2005/0144157 | A1* | 6/2005 | Moody et al. ........... 707/3 |
| 2005/0210102 | A1* | 9/2005 | Johnson et al. ........... 709/204 |
| 2006/0010420 | A1* | 1/2006 | Peterson et al. ........... 717/106 |
| 2006/0218245 | A1* | 9/2006 | Horn ........... 709/218 |
| 2008/0046840 | A1* | 2/2008 | Melton et al. ........... 715/825 |
| 2008/0184138 | A1* | 7/2008 | Krzanowski et al. ........ 715/760 |

(Continued)

OTHER PUBLICATIONS

"Delete History—Features of Privacy Eraser Pro", Privacy Eraser Computing, Inc., 2000-2007, pp. 1-4.

(Continued)

*Primary Examiner* — Yongjia Pan
*Assistant Examiner* — Haimei Jiang
(74) *Attorney, Agent, or Firm* — Workman Nydegger

(57) ABSTRACT

Various embodiments enable a user to use their browser to selectively delete items that are not of interest to them. In at least some embodiments, a user's interest in a particular item is implied by some action a user has taken with respect to the particular item. Responsive to this implied interest, various delete operations that can be performed relative to the items are performed so as to exclude items in which a user has some implied interest. In one or more embodiments, items that appear on a user-specified list, such as a favorites or a bookmarked list, are not deleted when a delete operation is performed relative to items to which a user browses. In at least some embodiments, a user interface is provided and enables a user to select classes of items that are to be retained when delete operations are performed.

22 Claims, 6 Drawing Sheets

(56) References Cited

U.S. PATENT DOCUMENTS

2010/0131584 A1* 5/2010 Johnson .................. 709/203

OTHER PUBLICATIONS

"SIMS 8.9 PC Browser FAQ's for Staff", Retreived at <<http://www.sfu.ca/sims/documents/CS_PC_Browser_FAQ_Staff.pdf>>, pp. 1-28.
"Clear History Software", MoRUN.net., 2002-2007, pp. 1-9.
"Delete History Free", Retreived at <<http://www.sharewareconnection.com/delete-history-free.htm>>, pp. 1-2.
"Clear my Tracks: yes please!!!!", Retreived at <<http://blogs.msdn.com/ie/archive/2006/01/12/512232.aspx>>, pp. 1-30.

* cited by examiner

SELECTIVELY DELETING ITEMS THAT ARE NOT OF INTEREST TO A USER

BACKGROUND

When a user browses on the Web, their Web browser typically writes data to a cache or history file that describes aspects of a user's browsing activities. For example, a user's history file can include a list of websites to which a user has browsed, as well as cookies associated with those websites and other data. Often times, and typically for privacy and/or performance reasons, a user will opt to delete these files using a feature, e.g. "Delete Browsing History", that is provided by their Web browser. The delete feature offered by most if not all browsers tends to be indiscriminate in what it deletes. Specifically, such features typically delete all of a user's collected data when such feature is selected by the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments enable a user to use their browser to selectively delete items that are not of interest to them. In at least some embodiments, a user's interest in a particular item is implied by some action a user has taken with respect to the particular item. Responsive to this implied interest, various delete operations that can be performed relative to the items are performed so as to exclude items in which a user has some implied interest.

In one or more embodiments, items that appear on a user-specified list, such as a favorites or a bookmarked list, are not deleted when a delete operation is performed relative to items to which a user browses.

BRIEF DESCRIPTION OF THE DRAWINGS

The same numbers are used throughout the drawings to reference like features.

DETAILED DESCRIPTION

Overview

Various embodiments enable a user to use their browser to selectively delete items that are not of interest to them. In at least some embodiments, a user's interest in a particular item is implied by some action a user has taken with respect to the particular item. Responsive to this implied interest, various delete operations that can be performed relative to the items are performed so as to exclude items in which a user has some implied interest.

In one or more embodiments, items that appear on a user-specified list, such as a favorites or a bookmarked list, are not deleted when a delete operation is performed relative to items to which a user browses. In at least some embodiments, a user interface is provided and enables a user to select classes of items that are to be retained when delete operations are performed.

In the discussion above and below, the notion of an "item" is used to describe information that may be of interest to a user. Items can include, by way of example and not limitation, URLs, cookies, and/or any other information that can be collected and saved which describe, or are in some way associated with a user's browsing activities.

In the discussion that follows, a section entitled "Operating Environment" is provided and describes one environment in which one or more embodiments can be employed. Following this, a section entitled "Items in Which a User Has an Implied Interest" is provided and describes various items in which a user can have an implied interest. Next, a section entitled "Retaining Items in Which a User Has an Implied Interest" is provided and describes an example embodiment in which items can be selectively retained in view of a delete operation. Following this, a section entitled "Selectively Deleting Items in a User's Browsing History" is provided and describes an embodiment in which items in a user's browsing history can be selectively deleted. Next, a section entitled "Example User Interface" is provided and describes an example user interface in accordance with one or more embodiments. Finally, a section entitled "Example System" is provided and describes an example system in which one or more embodiments can be implemented.

Operating Environment

Figure 1:
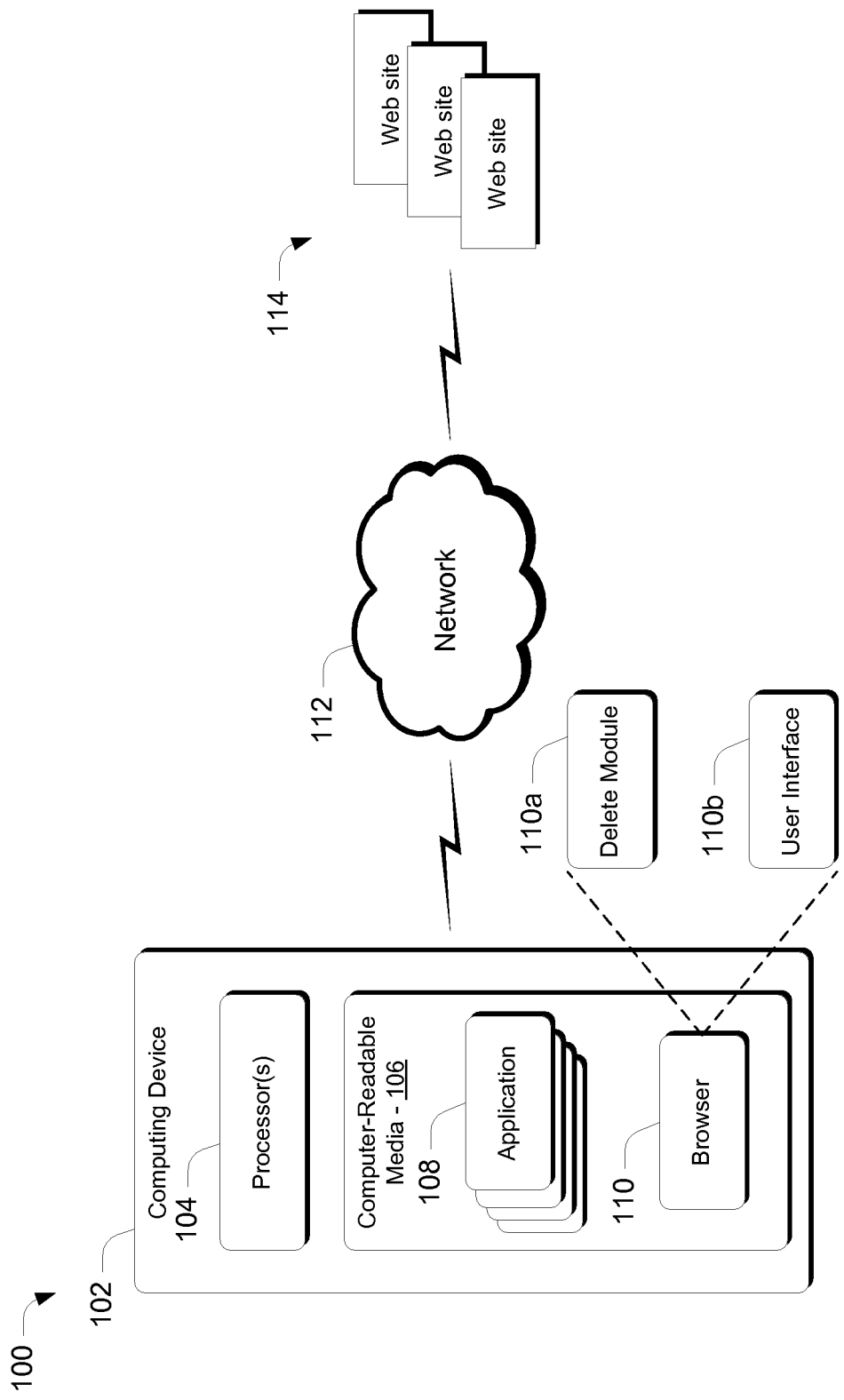
FIG. 1 illustrates an operating environment in which various principles described herein can be employed in accordance with one or more embodiments.

FIG. 1 illustrates an operating environment in accordance with one or more embodiments, generally at 100. Environment 100 includes a computing device 102 having one or more processors 104, one or more computer-readable media 106 and one or more applications 108 that reside on the computer-readable media and which are executable by the processor(s). The computer-readable media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 6.

In addition, computing device 102 includes a software application in the form of a Web browser 110. Any suitable Web browser can be used examples of which are available from the assignee of this document and others. In at least some embodiments, Web browser 110 is configured to enable a user to use their browser to selectively delete items that are not of interest to them. In at least some embodiments, a user's interest in a particular item is implied by some action a user has taken with respect to the particular item. Responsive to this implied interest, various delete operations that can be performed relative to the items are performed so as to exclude items in which a user has some implied interest. Further, in at least some embodiments, the Web browser enables a user to define a user-specified list. Items that appear on a user-specified list, such as a favorites or a bookmarked list, are not deleted when a delete operation is performed relative to items to which a user browses. In at least some embodiments, a user interface is provided and enables a user to select classes of items that are to be retained when delete operations are performed. To this end, Web browser 110 includes or otherwise provides a user with access to an associated delete module 110a and a user interface module 110b. Logic implemented by the delete module is described in more detail below. In addition, an example user interface provided by user interface module 110b is shown and described below in connection with FIG. 5. It is to be appreciated and understood that the functionality provided by the delete module and/or the user interface module associated with the Web browser can be provided as a native part of a Web browser, a Web browser extension or "plug-in", or as code modules that are separate from but work in association with the Web browser.

In addition, environment 100 includes a network 112, such as the Internet, and one or more Web sites 114 from and to which content can be received and sent.

Computing device 102 can be embodied as any suitable computing device such as, by way of example and not limitation, a desktop computer, a portable computer, a handheld computer such as a personal digital assistants (PDA), cell phone, and the like.

Items in Which a User Has an Implied Interest

Various embodiments enable a user to use their browser to selectively delete items that are not of interest to them. In at least some embodiments, a user's interest in a particular item is implied by some action a user has taken with respect to the particular item. Responsive to this implied interest, various delete operations that can be performed relative to the items are performed so as to exclude items in which a user has some implied interest.

In one or more embodiments, a Web browser can imply a user's interest in a particular item based upon some action that a user has taken with respect to the particular item. A user's implied interest can be ascertained based on any suitable action that a user can take. For example, if a user has most recently browsed to an item, then the item may be of particular interest to the user. Alternately or additionally, if a user frequently browses to particular items on the Web, these items may be of particular interest to a user. Alternately or additionally, if a user has proactively added a particular item to their favorites list or has otherwise bookmarked a particular item, this item is of particular interest to a user.

In these as well as other instances, when a user conducts a delete operation, such as selecting to delete a group of items to which a user has browsed, the Web browser can take steps to ensure that those items in which there is an implied user interest are not deleted.

Retaining Items in Which a User Has an Implied Interest

Figure 2:
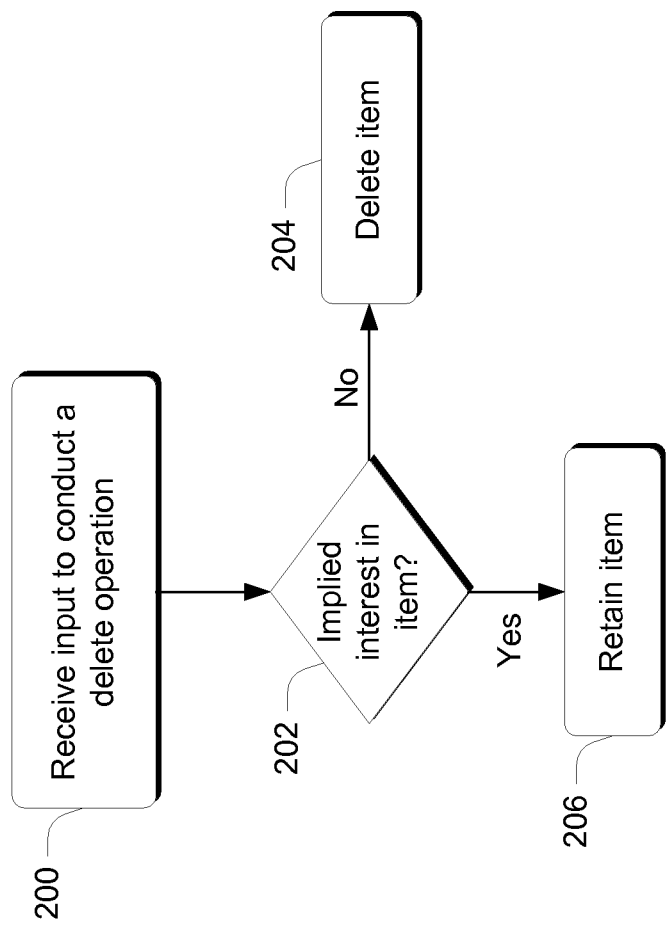
FIG. 2 illustrates a flow diagram that describes steps in a method in accordance with one or more embodiments.

FIG. 2 is a flow diagram that describes steps in a method in accordance with one or more embodiments. The method can be implemented in connection with any suitable hardware, software, firmware or combination thereof. In at least some embodiments, aspects of the method can be implemented by an application, such as a suitably configured Web browser such as the one illustrated and described in FIG. 1.

Step 200 receives input to conduct a delete operation. This step can be performed in any suitable way. For example, in at least some embodiments, a user can indicate via a suitably-configured user interface that they wish to delete a class of items. Alternately or additionally, a user's Web browser may be configured to automatically, periodically, delete items or classes of items. Step 202 ascertains whether a user has an implied interest in an item. A user can have an implied interest in a particular item for any number of reasons examples of which are provided above. If, at 202, a user does not have an implied interest in a particular item, step 204 deletes the item. If, on the other hand, a user has an implied interest in a particular item, step 206 retains the item. By retaining the item, the item can remain available for use by the user's Web browser. Such can include, by way of example and not limitation, retaining the item in an appropriate store (whether local or remote) such that the item is available for use by the Web browser.

Accordingly, in this manner, a user can selectively delete items that are not of interest to them and retain items that are of interest to them.

Having described the notion of an implied interest and how that implied interest can be used, consider now a specific example embodiment in which items can be selectively deleted from a user's browsing history.

Selectively Deleting Items in a User's Browsing History

Figure 3:
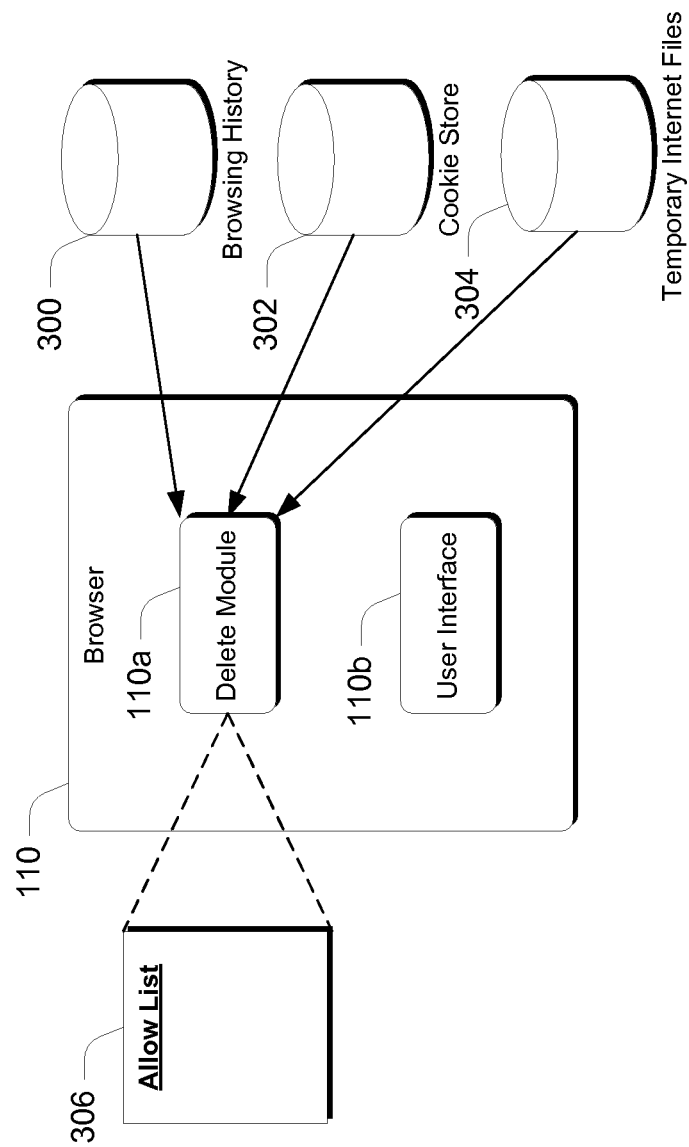
FIG. 3 illustrates an example Web browser in accordance with one or more embodiments.

FIG. 3 illustrates a system in accordance with one or more embodiments. In this example, a Web browser 110 includes or otherwise makes use of an associated delete module 110a and a user interface module 110b. The delete module is utilized by the Web browser to selectively delete items as described above and below. The user interface module is used to provide a mechanism by which a user can indicate their preference to selectively delete various items as described above and below.

In this example, a user's browsing history can be manifest by items that are stored in one or more different stores including, by way of example and not limitation, a browsing history store 300, a cookie store 302, and/or a temporary Internet files store 304. Although these stores are illustrated as separate stores, such stores can reside in the form of one logical store that stores associated items.

Further, the delete module 110a maintains or otherwise has access to a so-called allow list 306 which maintains a list of items in which a user has an implied interest. A user can have an implied interest in items such as those items to which a user has most recently browsed, has most frequently browsed, and/or has otherwise indicated as being important to the user. A user can indicate an item's importance by, for example, adding the item to a user-specified list, such as a favorites list or a bookmarked list. Other lists can, of course, be used to reflect a user's interest.

When a user wishes to delete a class of items, the user can effect a delete operation by way of invoking a user interface provided by user interface module 110b. An example of one user interface that can be used is provided just below. When a delete operation is invoked, whether through a specific user action or otherwise, a class of items subject to the delete operation can be compared to a list of items appearing on the allow list 306. If an item appears on the allow list 306, then the item is not deleted during the delete operation. If, on the other hand, the item does not appear on the allow list 306, the item is deleted. So, for example, a user's browsing history may include a number of URLs to which a user has browsed. When the user opts to delete their browsing history, URLs appearing on the allow list 306 are not deleted. Alternately or additionally, when a user opts to delete their cookies, cookies appearing on allow list 306 are not deleted. Similarly, if a user opts to delete their temporary Internet files, temporary Internet files that appear on the allow list 306 are not deleted.

In this way, items that are of interest to a user, whether implied through a particular user action or proactively specified by the user are retained for future use by the Web browser.

Figure 4:
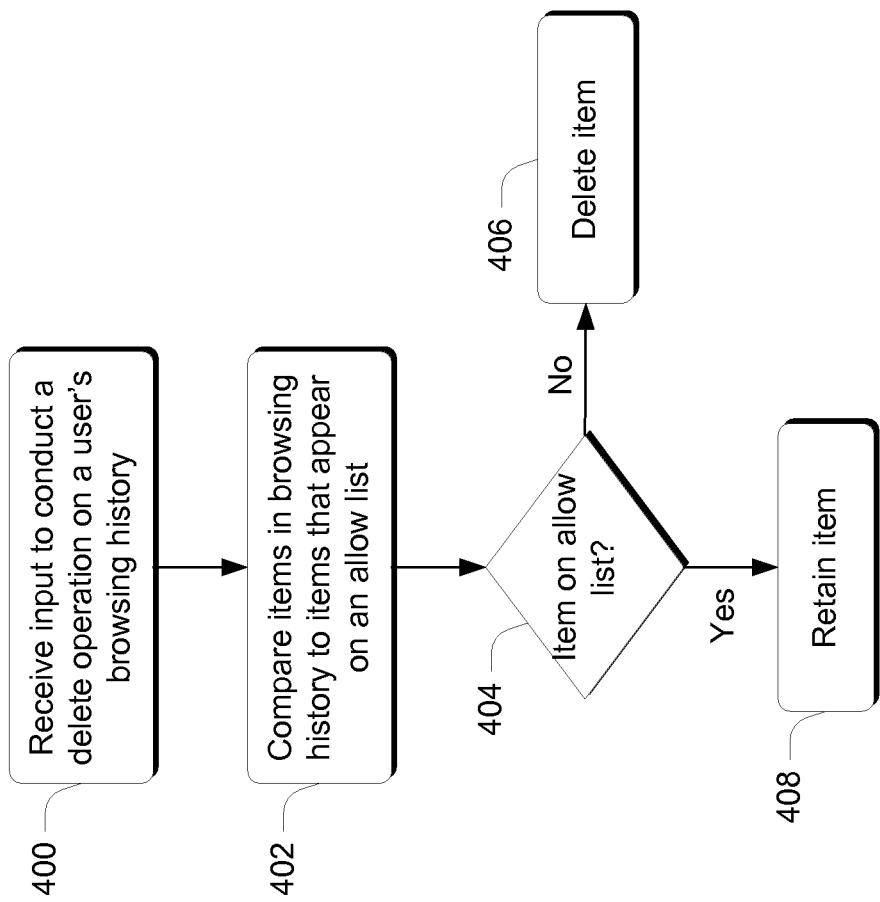
FIG. 4 illustrates a flow diagram that describes steps in a method in accordance with one or more embodiments.

FIG. 4 is a flow diagram that describes steps in a method in accordance with one or more embodiments. The method can be implemented in connection with any suitable hardware, software, firmware or combination thereof. In at least some embodiments, aspects of the method can be implemented by an application, such as a suitably configured Web browser.

Step 400 receives input to conduct a delete operation on a user's browsing history. This step can be performed in any suitable way. For example, the user can, through a suitably-configured user interface, indicate that a delete operation is to be performed relative to their browsing history. Step 402 compares items in the user's browsing history to items that appear on an allow list. Examples of items that appear on an allow list and how such items can come to reside on the allow list are given above. The comparison that is performed at step 402 can be performed in any suitable way. For example, one comparison can compare portions of an URL's domain or an entire domain. Specifically, a top-level domain and one or more sub-domains can be used in the comparison. For example, in the URL "mail.Yahoo.com", the top-level domain "com" in combination with the sub-domain "Yahoo" can be used as a basis for the comparison. Other comparisons can, of course, be used without departing from the spirit and scope of the claimed subject matter.

If, at step 404, an item does not appear on the allow list, step 406 deletes the item. If, on the other hand, the item does appear on the allow list, step 408 retains the item.

Having described various embodiments in which items can be selectively deleted, consider now an example user interface that can be utilized to implement one or more of the above-described embodiments.

Example User Interface

Figure 5:
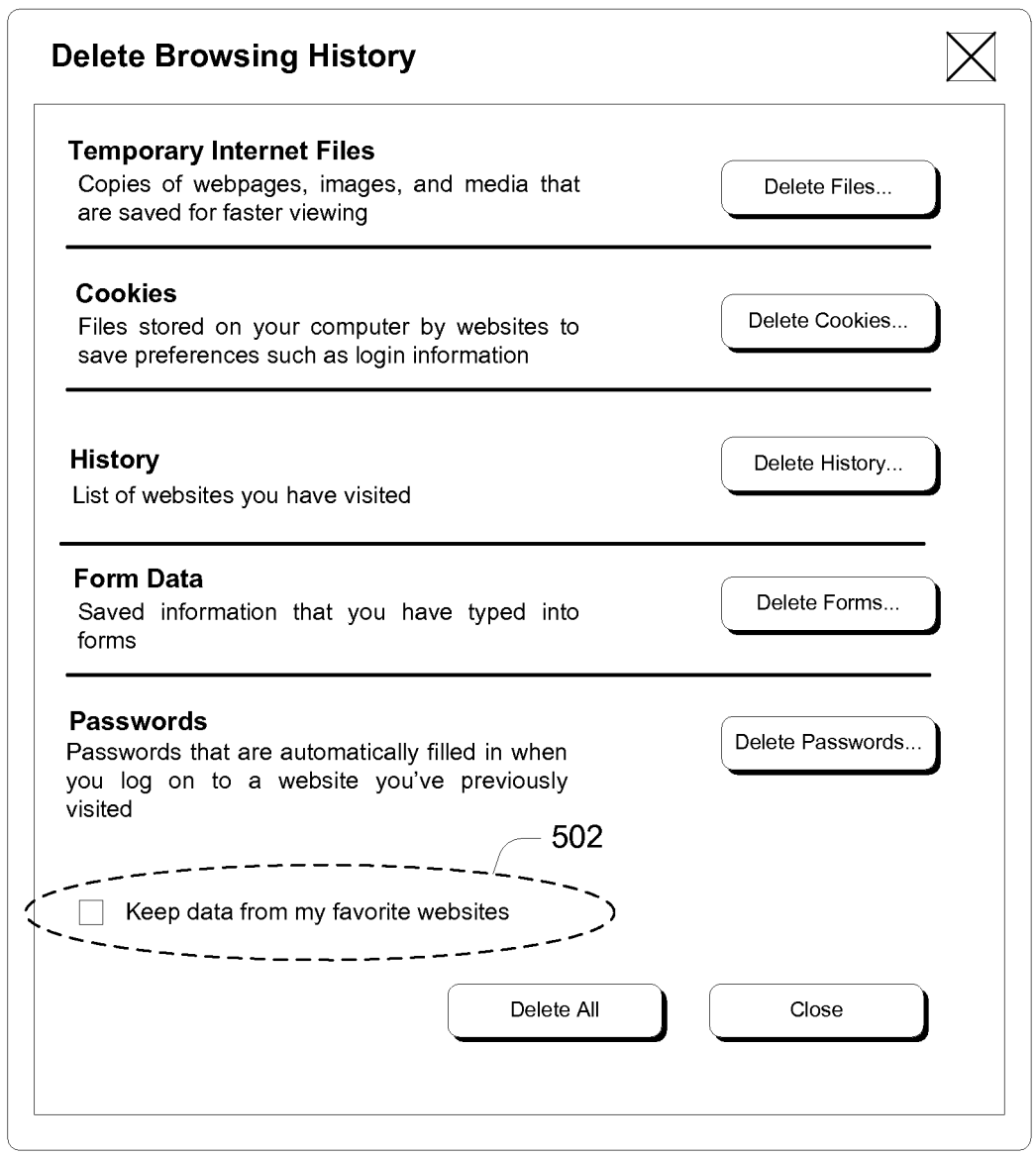
FIG. 5 illustrates an example user interface in accordance with one or more embodiments.

FIG. 5 illustrates an example user interface in accordance with one or more embodiments generally at 500. User interface 500 can be provided in any suitable way. In at least some embodiments, user interface 500 is provided via a user interface module such as that described above in FIG. 1.

In the illustrative example, user interface 500 comprises a "Delete Browsing History" window that provides a number of different classes of items that can be deleted by a user. For example, in this specific instance, classes of items that can be deleted include, by way of example and not limitation, temporary Internet files, cookies, history, form data, and passwords. In this example, a user interface instrumentality 502 is provided to enable a user to selectively define items that are not to be deleted when a delete operation is conducted. In this particular example, a user can opt to keep data from their favorite websites by simply checking the check box. Accordingly, when a user opts to delete their browsing history, if the check box of instrumentality 502 has been checked, those items appearing in an associated allow list are not deleted. In this instance, the items appearing in the associated allow list would include those items that appear as a user's favorite websites.

Having described an example user interface that can be used to selectively delete various items, consider now an example system that can be utilized to implement one or more of the above-described embodiments.

Example System

Figure 6:
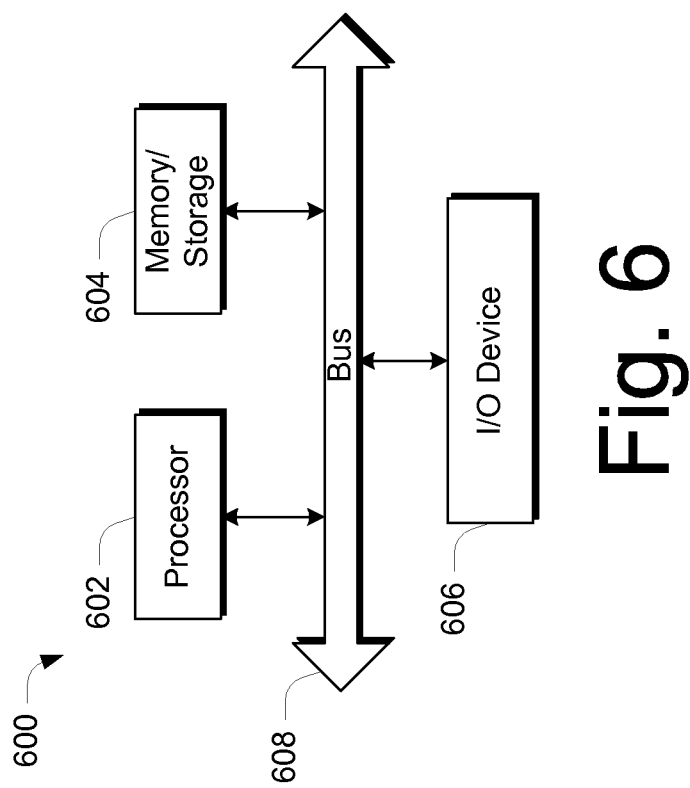
FIG. 6 illustrates an example system that can be used to implement one or more embodiments.

FIG. 6 illustrates an example computing device 600 that can implement the various embodiments described above. Computing device 600 can be, for example, computing device 102 of FIG. 1 or any other suitable computing device.

Computing device 600 includes one or more processors or processing units 602, one or more memory and/or storage components 604, one or more input/output (I/O) devices 606, and a bus 608 that allows the various components and devices to communicate with one another. Bus 608 represents one or more of any of several types of bus structures, including a memory bus or memory controller, a peripheral bus, an accelerated graphics port, and a processor or local bus using any of a variety of bus architectures. Bus 608 can include wired and/or wireless buses.

Memory/storage component 604 represents one or more computer storage media. Component 604 can include volatile media (such as random access memory (RAM)) and/or nonvolatile media (such as read only memory (ROM), Flash memory, optical disks, magnetic disks, and so forth). Component 604 can include fixed media (e.g., RAM, ROM, a fixed hard drive, etc.) as well as removable media (e.g., a Flash memory drive, a removable hard drive, an optical disk, and so forth).

One or more input/output devices 606 allow a user to enter commands and information to computing device 600, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments enable a user to use their browser to selectively delete items that are not of interest to them. In at least some embodiments, a user's interest in a particular item is implied by some action a user has taken with respect to the particular item. Responsive to this implied interest, various delete operations that can be performed relative to the items are performed so as to exclude items in which a user has some implied interest.

In one or more embodiments, items that appear on a user-specified list, such as a favorites or a bookmarked list, are not deleted when a delete operation is performed relative to items to which a user browses. In at least some embodiments, a user interface is provided and enables a user to select classes of items that are to be retained when delete operations are performed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
one or more computer-readable storage media;
a web browser embodied on the one or more computer-readable storage media;
a delete module embodied on the one or more computer-readable storage media, the delete module being associated with the web browser and being configured to:
receive input to conduct a delete operation;
during a browsing session, ascertain whether a user has an implied interest to retain an item targeted by the delete operation that is implied from a user action other than user selection of the item for retention, wherein the delete module ascertains that a user has an implied interest to retain an item based in part on whether the user recently browsed, using the web browser, to the item and without additional user interaction with the item;
delete the item if the user does not have an implied interest in the item, but retain items that the user has selectively defined are not to be deleted when a delete operation is conducted; and
retain both the item if the user has an implied interest in the item and the items that the user has selectively defined are not to be deleted when a delete operation is conducted; and
a user interface module embodied on the one or more computer-readable storage media, the user interface module being associated with the web browser and being configured to enable a user to selectively define the items that are not to be deleted when a delete operation is conducted.

2. The system of claim 1, wherein the delete module ascertains that a user has an implied interest to retain an item based on an action that the user has taken with respect to the item.

3. The system of claim 1, wherein the delete module ascertains that a user has an implied interest to retain an item if the item appears in a user-specified list.

4. The system of claim 3, wherein the user-specified list comprises a favorites list.

5. The system of claim 1, wherein the delete module ascertains that a user has an implied interest to retain an item if the user frequently browses to the item.

6. The system of claim 1, wherein the delete module and the user interface module comprise a native part of the web browser.

7. The system of claim 1, wherein the delete module ascertains that a user has an implied interest to retain an item if the user has bookmarked an item.

8. The system of claim 1, wherein said item comprises an item from the user's browsing history.

9. A system comprising:
one or more processors;
one or more computer-readable storage media embodying software instructions which, when executed, implement a method comprising:
receiving input to conduct a delete operation on a user's browsing history;
during a browsing session, comparing items in the user's browsing history to items that appear on an allow list that includes items that the user has an implied interest to retain and items that the user has selectively defined are not to be deleted when a delete operation is conducted, said interest being implied from user actions other than user selection of the items for retention, said interest being implied based in part on whether the user recently browsed, using a browser, to the item and without additional user actions with the item;
deleting one or more items if the one or more items do not appear on the allow list; and
retaining items that appear on the allow list.

10. The system of claim 9, wherein the allow list includes a list of items that have been specified by the user.

11. The system of claim 10, wherein the list of items that have been specified by the user comprise a user's favorites list.

12. The system of claim 10, wherein the list of items that have been specified by the user comprise items that have been bookmarked by the user.

13. The system of claim 10, wherein said deleting is performed via a user interface from which a user can select items to appear on the allow list.

14. The system of claim 9, wherein said comparing is performed by comparing at least portions of an URL's domain, the URL being associated with an item.

15. A computer-implemented method comprising:
providing a user interface, as part of a Web browser, that provides a number of different classes of items that can be deleted by a user;
providing, as part of the user interface, a single-action-selectable user interface instrumentality that is configured to enable a user to affect, through a single action, how a delete operation is performed relative to at least one class of items;
receiving input, via said user interface, to conduct a delete operation on a user's browsing history; and
conducting a delete operation including allowing said single-action-selectable user interface instrumentality to affect the delete operation and retaining both items that the user has an implied interest to retain and items that the user has selectively defined are not to be deleted when a delete operation is conducted, wherein said interest to retain an item is implied based in part on whether the user frequently browses, using the Web browser and during one or more browsing sessions, to the item and without additional user interaction with the item.

16. The method of claim 15, wherein the different classes of the items comprise temporary Internet files, cookies, and browsing history.

17. The method of claim 15, wherein the user interface instrumentality enables a user to selectively define favorite websites that are not to be deleted.

18. The method of claim 15, further comprising:
responsive to said receiving input, via said user interface, to conduct a delete operation on a user's browsing history:
comparing items in the user's browsing history to items that appear on an allow list, wherein the allow list contains items defined via said user interface instrumentality;
deleting one or more items if the one or more items do not appear on the allow list; and
retaining items that appear on the allow list.

19. The method of claim 15, wherein said comparing is performed by comparing at least portions of a URL's domain, the URL being associated with an item.

20. The method of claim 15, wherein said single-action-selectable user interface instrumentality comprises a check box.

21. The method of claim 15, wherein said single-action-selectable user interface instrumentality is configured to receive non-textual input.

22. The method of claim 15, wherein said single-action-selectable user interface instrumentality is configured to enable multiple items to be affected by the delete operation via the single action.

* * * * *